United States Patent [19]

Frugé et al.

[11] Patent Number: 5,200,866
[45] Date of Patent: Apr. 6, 1993

[54] MOTORIZED SPINDLE FOR DISK DRIVE

[75] Inventors: Tave J. Frugé, Colorado Springs; James C. Mao, Monument, both of Colo.

[73] Assignee: Digital Equipment Corporation, Maynard, Mass.

[21] Appl. No.: 682,726

[22] Filed: Apr. 9, 1991

[51] Int. Cl.⁵ .................................... G11B 17/02
[52] U.S. Cl. ........................... 360/99.08; 360/98.07
[58] Field of Search .............. 360/98.07, 99.04, 99.05, 360/99.08, 99.12; 369/270, 271

[56] References Cited

U.S. PATENT DOCUMENTS

| | | | |
|---|---|---|---|
| 4,604,665 | 8/1986 | Muller et al. | 360/97 |
| 4,683,505 | 7/1987 | Schmidt et al. | 360/98 |
| 4,754,351 | 6/1988 | Wright | 360/97 |
| 4,795,275 | 1/1989 | Titcomb et al. | 384/107 |
| 4,965,476 | 10/1990 | Lin | 360/99.08 |
| 4,965,686 | 10/1990 | Young et al. | 360/99.08 |

OTHER PUBLICATIONS

Matsushita, "Vibration Analysis of Disk-Spindle Due to Ball Bearing Excitation" Bulletin of Japanese Society of Mechanical Engineers, vol. 29, No. 256, Oct. 1986.

Primary Examiner—Robert S. Tupper
Attorney, Agent, or Firm—Fish & Richardson

[57] ABSTRACT

A disk drive spindle with a rotatable hub combines the advantages of a stationary shaft, a cartridge bearing assembly, and a motor mounted axially between the individual bearings of the cartridge bearing to rotate the hub with respect to the stationary shaft. The stator of the motor is mounted to the shaft so that it is disposed radially outwardly of the bearing assembly and at least partially axially between the individual bearings. The motor mount is cup shaped and has a central opening that axially receives and surrounds at least part of the bearing assembly, with the stator being secured to an outer surface of the cup. Alternately stated, one end of the bearing assembly is recessed within the mount.

31 Claims, 5 Drawing Sheets

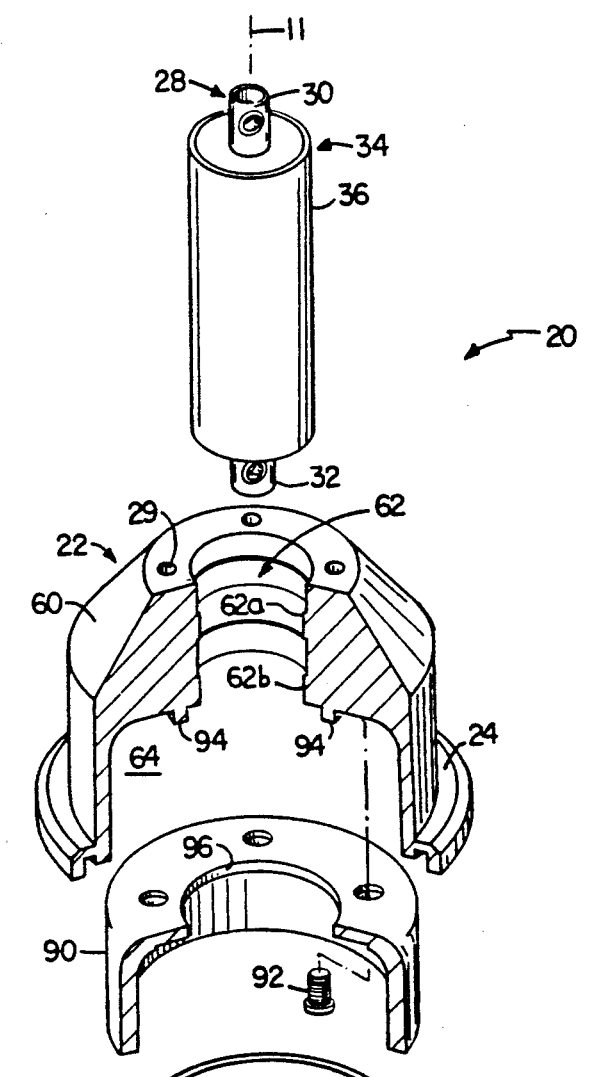
FIG. 3
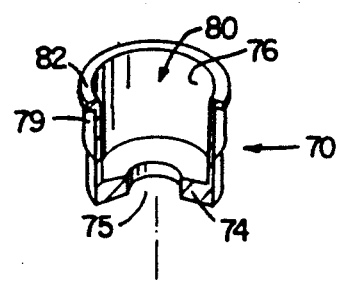

MOTORIZED SPINDLE FOR DISK DRIVE

BACKGROUND OF THE INVENTION

This invention relates to spindles for supporting and rotating one or more memory disks in a disk drive.

In a typical spindle, the disks are clamped to a cylindrical hub, which in turn is mounted to a shaft. A motor mounted within the hub rotates the hub and disks. In some spindles, the shaft and hub are axially mounted on and rotate together about a stationary tube secured to the base of the disk drive; in others, the shaft is the stationary member. A bearing assembly (e.g., that includes individual ball bearings or hydrodynamic bearings) permits the relative rotation between the rotatable and stationary members of the spindle. In both types of spindles, the stator of the motor is secured to the stationary member (i.e., the support tube or the shaft), and the rotor is mounted within a cavity in the lower end of the hub.

Some spindles use cartridge bearing assemblies, that is, bearing assemblies in which the outer races of the individual bearings are formed (such as by machining) in a single sleeve. In others, the outer races of the individual bearings are formed in separate rings that are axially separated by a spacer.

SUMMARY OF THE INVENTION

In one general aspect of the invention, the hub of the spindle is supported by a bearing assembly for rotation about a stationary shaft, and a portion of the motor (e.g., the stator) is mounted to the shaft so that it is disposed radially outwardly of the bearing assembly and at least partially axially between a pair of bearings of the bearing assembly.

Preferred embodiments include one or more of the following features.

The motor mount meets the shaft at a region axially spaced from one end of said bearing assembly and includes a support region for the motor that extends axially along the rotatable sleeve of the bearing assembly and is spaced radially from the sleeve. More specifically, the support region has a free end that is disposed axially adjacent to at least a portion of one of the bearings.

The mount is cup shaped and has a central opening that axially receives and surrounds at least part of the bearing assembly; the stator is secured to an outer surface of the cup. Alternately stated, one end of the bearing assembly is recessed within the mount. This configuration allows a cartridge bearing assembly to be used in place of individual, spacer separated bearing rings. Because the outer races of a cartridge bearing are machined (usually at the same time) in a single sleeve, the relative positions of the races, and hence of the individual bearings, are precisely aligned in parallel around their entire circumferences. Bearings aligned in this manner trace paths about a common axis, thereby increasing the rotational stability of the spindle by reducing the tendency of the hub to wobble about the axis of rotation. The friction on the individual bearings (with resultant heat built up and wear) is also reduced. Another advantage of a cartridge bearing is that it can be fully tested before assembly of the spindle. The bearing assembly uses ball bearings or hydrodynamic bearings.

The mount includes a radially extending lip near its free end for locating the stator at a predetermined axial position with respect to the first bearing. The stator is secured to the mount with adhesive (such as epoxy) or by heat shrinking. Excess adhesive is collected in an opening in the lip.

The base of the mount is axially spaced from the bearing assembly and connects the support region (i.e., the sides of the cup) to the shaft. In one embodiment, the base has an axially enlarged shoulder near the junction with the shaft to provide additional structural support.

In applications in which the orientation of the bearing assembly in the spindle is important, the cup is configured so that the central opening generally conforms to the configuration of one of the ends of the bearing assembly (which usually differs from that of the opposite end to indicate which end should be recessed within the mount).

The hub is secured to the sleeve (such as by heat shrinking or with adhesive) and supports a second portion of motor (i.e., the rotor) adjacent to the stator within a cavity of the hub so that the rotor is centered with respect to the axis of rotation. The hub is constructed to engage the sleeve at a pair of spaced regions that are each axially separated from the individual bearings. Spacing the contact regions provides stability, and positioning each contact region remotely from the individual bearings avoids distorting the bearing races (particularly when the hub is heat shrunk to the sleeve and ball bearings are used).

The spindle is assembled by securing the hub to the bearing assembly near one end thereof, attaching the mount to the shaft near the opposite end of the bearing assembly, and securing the stator on the mount. The mount may be attached to the shaft prior to securing the stator, or not. Preferably, both the hub and the mount are attached by heat shrinking. Alternatively, adhesive may be used. In yet another embodiment, the mount and said shaft comprise a unitary structure.

Preferably, both ends of the shaft are secured to the housing of the disk drive. This significantly increases the overall rigidity of the spindle within the housing compared with spindles that are axially cantilevered in the housing, and is particularly advantageous when the spindle is used with relatively large (such as 9 inch) diameter disks. At one end, the shaft is mounted to the housing so that a disk support surface of the hub is disposed at a predetermined axial position in the housing. This is done by accurately positioning the support surface with respect to a mounting hole in the shaft, which in turn is engaged by a closely fitting pin on the housing. The tight fit between the pin and shaft also substantially prevents axial movement of the shaft. The pin has a smaller transverse dimension to permit the position of the shaft to be adjusted in a direction oriented transversely to the axis of the shaft.

The spindle of the invention combines the advantages of a cartridge bearing, a motor mounted axially between the individual bearings, and a stationary shaft to provide a spindle that is compact and highly rigid to transverse forces (e.g., forces applied perpendicularly to the axis of the shaft by the motor). The placement of the motor between the individual (e.g., upper and lower) bearings allows the axial spacing between the bearings to be maximized while avoiding excessive axial distances between the motor and each bearing. Large bearing spacing provides increased resistance to "wobbling" of the hub during rotation in response to transverse forces. Also, because the bearings are located on opposite sides of the motor, they are loaded in the same direction by the transverse forces, which results in further resistance to wobbling. The bearings also share the transverse forces applied by the motor more equally than if the bearings were both located on the same side as (e.g., above) the motor.

Other features and advantages of the invention will become apparent from the following detailed description, and from the claims.

DESCRIPTION OF THE PREFERRED EMBODIMENTS

We first briefly describe the drawings.

FIG. 3 is an exploded view of the spindle of FIG. 2

STRUCTURE AND OPERATION

Figure 1:
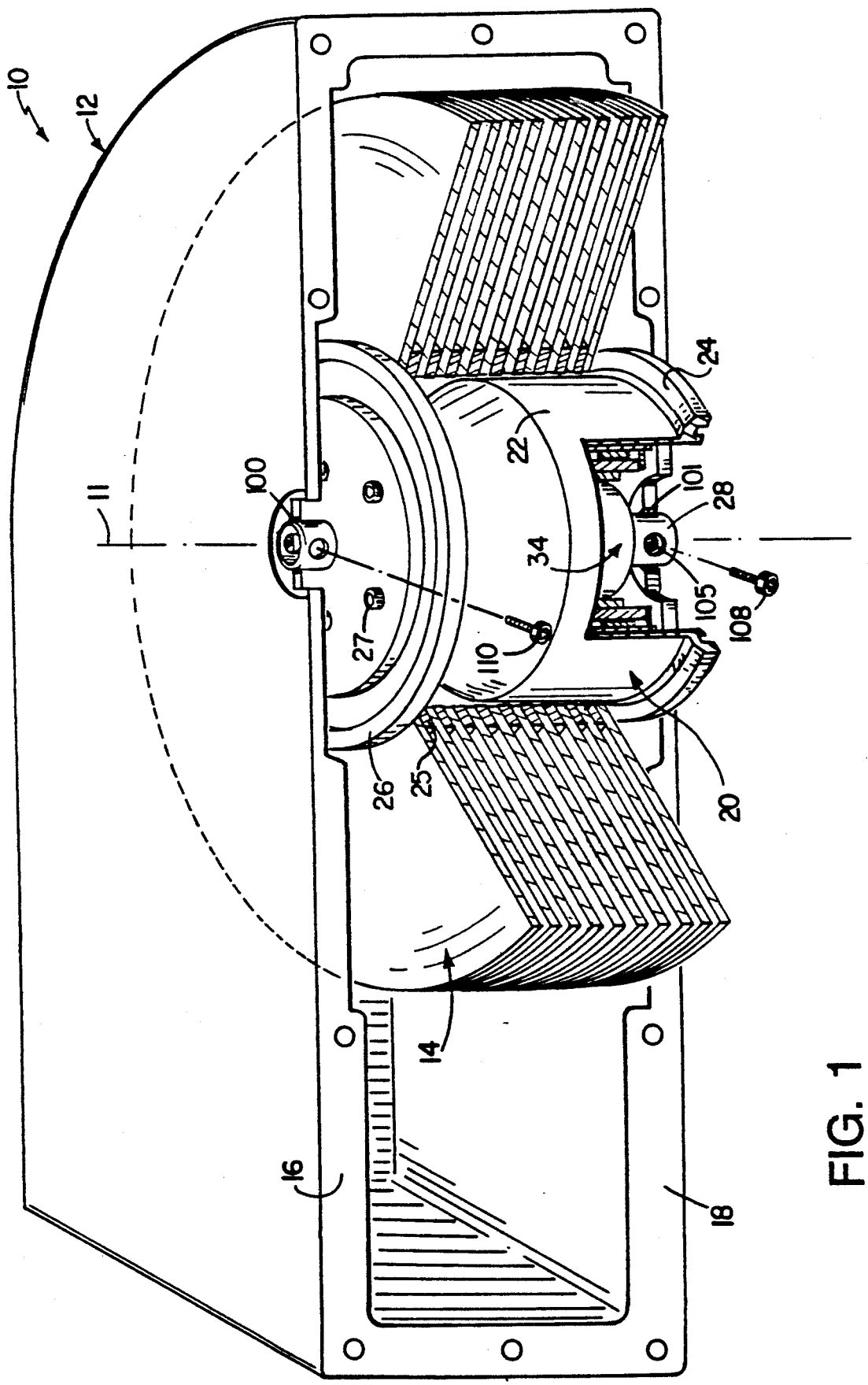
FIG. 1 is a somewhat diagrammatical view of a disk drive that includes the spindle of the invention.

Referring to FIG. 1, disk drive 10 includes a housing 12 that contains memory disks 14 and a head assembly (not shown) for reading information from and writing information onto disks 14. A spindle 20 secured to the upper wall 16 and the lower wall 18 supports disks 14 for rotation in housing 12 about axis 11. Disks 14 are nine inches in diameter, fit around a rotatable aluminum hub 22 of spindle 20, and rest on a shoulder 24 at the lower end of hub 22. Individual disks 14 are separated by spacers 25 and are secured onto hub 22 with clamp ring 26 and a series of bolts 27.

Figure 2:
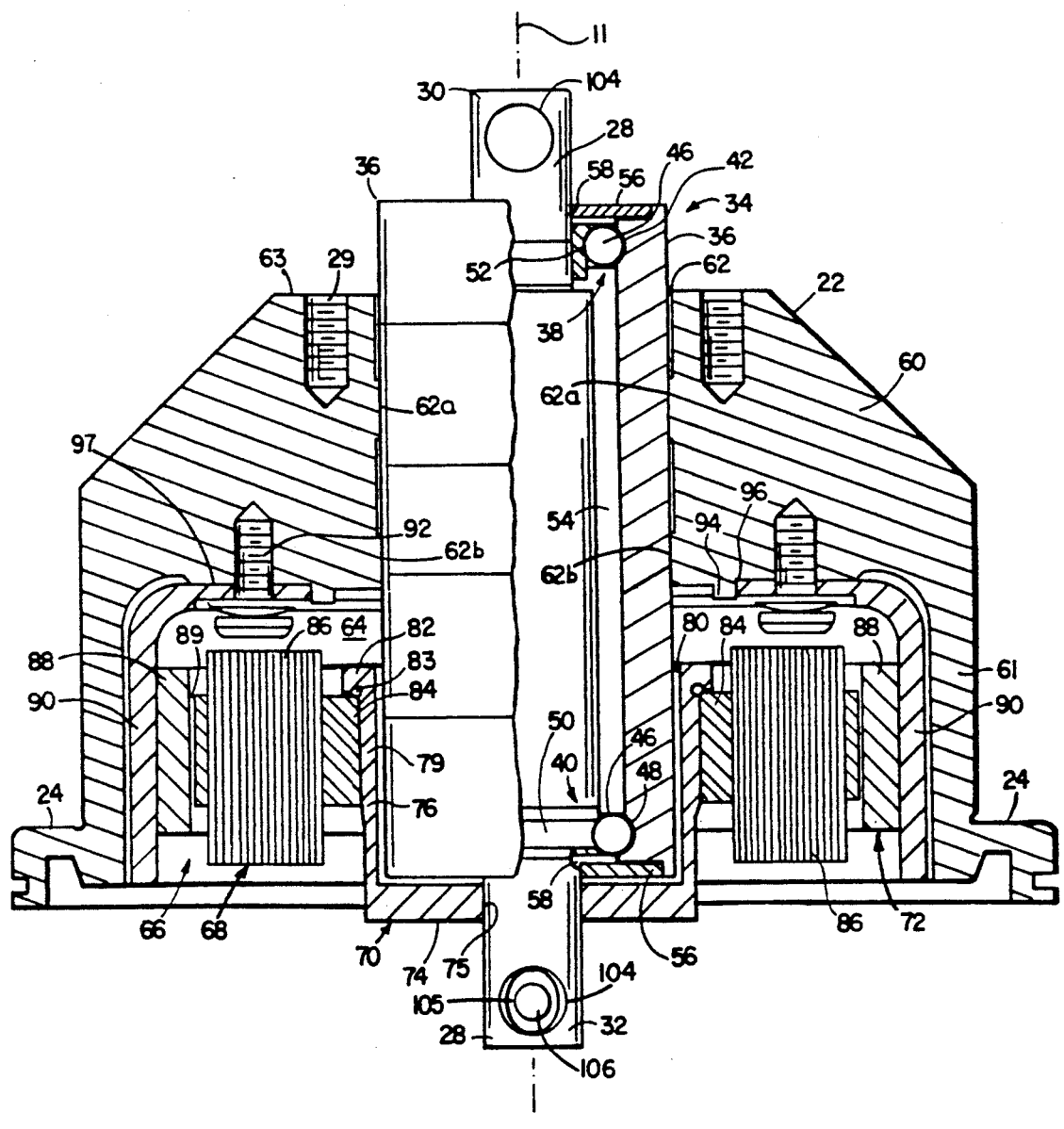
FIG. 2 is a partial cross-sectional view of one embodiment of the spindle of the invention.

Referring also to FIGS. 2 and 3, hub 22 is mounted for rotation about an elongated, stainless steel, stationary shaft 28. The upper and lower ends 30, 32 of shaft 28 are rigidly mounted to upper wall 16 and lower wall 18, respectively, in a manner described in detail below. A cartridge bearing assembly 34 supports hub 22 on shaft 28 and permits relative rotation therebetween. Bearing assembly 34 includes a single sleeve 36 that extends nearly the entire axial length of shaft 28 and supports an upper bearing 38 and a lower bearing 40 near the respective ends 30, 32 of shaft 28.

Upper bearing 38 includes an outer bearing surface (called a "37 race") 42 machined around the inner circumference of sleeve 36, and an opposing, inner race 52 bonded around the outer circumference of shaft 28. Theses races define a track for a set of precision ball bearings 46. Lower bearing 40 includes an outer race 48 machined around the circumference of the inner surface of sleeve 36. A set of precision ball bearings 46 are positioned between outer race 48 and an opposing inner race 50 formed in the surface of shaft 28. Upper and lower bearings 38, 40 each include a plastic retainer (not separately shown) for spacing ball bearings 46 circumferentially around the races. The space 54 between shaft 28 and sleeve 36 is filled with grease to maintain bearings 38, 40 fully lubricated. Each end of bearing assembly 34 is sealed to shaft 20 by a ring-shaped plate 56 and a magnetic fluid (i.e., ferrofluid) seal 58.

An upper region 60 of hub 22 includes a central opening 62 through which bearing sleeve is disposed. A pair of annular bands 62a, 62b having inside diameters which closely match the outside diameter of bearing sleeve 36 project into opening 62 for securing hub upper region 60 to sleeve 36 by shrink fitting. The remaining inner surface of opening 62 is out of contact with sleeve 36.

Upper and lower bands 62a, 62b are axially positioned to optimize both their spacing and the axial distances between bands 62a, 62b and corresponding upper and lower bearings 38, 40. Disposing bands 62a, 62b remotely from bearings 38, 40 reduces the possibility that the mounting pressure between sleeve 36 and hub 60 at bands 62a, 62b will distort the bearing races, and the stability with which hub 22 is mounted to sleeve 36 increases with increasing spacing between bands 62a, 62b. For example, bands 62a, 62b are approximately centered between upper and lower bearings 38, 40 and are separated by approximately the nominal diameter of opening 62 (e.g., 1.28 inches). Upper band 62a is recessed from an upper surface 63 of hub 60 to be disposed about 0.75 inches below upper bearing 38, and lower band 62b is located approximately 1 inch above lower bearing 40.

A series of threaded openings 29 in upper hub region 60 receive the bolts 27 for clamp ring 26 (FIG. 1). In the lower region 61 of hub 22, opening 62 expands into a cavity 64 which encases a motor 66. As described in detail below, the stator 68 of motor 66 is rigidly secured to shaft 28 by a stainless steel, cup-shaped mount 70, and the rotor 72 of motor 66 is attached to hub lower region 61.

Stator mount cup 70 includes a circular base 74 with a central opening 75 that is sized to fit securely and rigidly around shaft 28 near lower end 32. Opening 75 is approximately 0.0008 inch smaller than the outside diameter of shaft 28 at lower end 32. Base 74 is approximately 1.5 inches in diameter and 0.22 inches thick. The cylindrical sides 76 of cup 70 extend axially from base 74 (i.e., toward the upper end 30 of shaft 28) and define an opening 80 the diameter of which is slightly larger (i.e., by about 0.030 inches) than the outside diameter of bearing sleeve 36. This allows sleeve 36 to freely rotate within cup 70 without touching sides 76. The free end of sides 76 terminates axially in an annular, radially extending lip 82 located approximately one-third of the way between upper and lower bearings 38, 40, for purposes to be described. The length of cup 70 from the lower surface of base 74 to the underside of lip 82 is approximately 1.025 inches. Sides 76 are thin for reasons discussed in detail below. In the region 79 at which stator 68 engages cup 70, the thickness of sides 76 is slightly increased (to a maximum of about 0.080 inches) to provide a tight fit between stator 68 and cup 70.

Stator 68 includes motor coils 86 that are wound about the magnetic poles of a steel lamination stack 84. Stator 68 is rigidly mounted to cup 70 in a manner described in detail below. The inside diameter of laminated stack 84 closely approximates the outside diameter of cup sides 76 to ensure a tight fit between them.

Rotor 72 includes a magnet ring 88 magnetized with alternating discrete regions of oppositely-polarized magnetic domains. Ring 88 is mounted within a steel, ring-shaped cowling 90 that is disposed within hub cavity 64 against mounting surface 97 and is attached to the upper portion 60 of hub 22 by a set of bolts 92. Cowling 90 supports magnet ring 88 closely adjacent to the pole face of stator lamination stack 84 but spaced therefrom by an air gap 89. An annular flange 94 on hub 22 engages the edges 96 of cowling 90 to center rotor 72 about axis 11.

The assembly procedure is as follows. Cartridge bearing assembly 34 is preassembled onto shaft 28. The components of motor 66 are also preassembled to some degree. Specifically, a small printed circuit board (not shown) for controlling the operation of motor is attached to stator 68, and magnet ring 88 is epoxied within rotor cowling 90.

Hub 22 is heated to approximately 300 degrees F. to slightly expand opening 62, and is then placed in a mounting fixture (not shown). The bearing-shaft subassembly is inserted within hub 22 until disk mounting shoulder 24 is disposed at a predetermined, precise distance (such as approximately 0.6775 +/−0.002 inches) axially above the center of a mounting hole 104 in lower end 32 of shaft 28. As explained below, this helps ensure that the disks will be positioned accurately within housing 12. Hub 22 is cooled by passing air over hub 22 (or simply by allowing hub 22 to stand at room temperature), which contracts hub 22 tightly around sleeve 36 at bands 62a, 62b.

Next, stator mount cup 70 is heated to about 480 degrees F. and inserted over lower end 32 of shaft 28. Cup 70 is advanced on shaft 28 until the upper surface of cup lip 82 is axially disposed a predetermined distance below mounting surface 97 of hub 22. This helps ensure that stator 68 and rotor 72 will be properly axially aligned. Cup 70 is cooled by forced air convection (or allowed to stand until cooled) to shrink fit base 74 tightly around shaft 28. Because base 74 and sides 76 of cup 70 are thin, the time required to heat cup 70 sufficiently (and also to cool cup 70 after installation on shaft 28) is relatively small. As a result, the risk of possibly damaging levels of heat conduction from cup 70 to lower bearing 40 is reduced. The relatively large surface area of cup 70 also assists in heat removal.

Then, motor 66 is installed in a two step procedure. First, the preassembled rotor 72 (cowling 90 and magnet ring 88) is placed in cavity 64 against mounting surface 97 and around flange 94, and is then fastened onto hub 22 with bolts 92. Next, stator 68 is attached to cup 70. This is done by placing epoxy on the outer surface of cup sides 76 and on the inner surface of stator lamination stack 84, and then sliding stack 84 over cup 70 from the lower end 32 of Shaft 28. Stator 68 is advanced over sides 76 until lamination stack 84 engages lip 82. The outside diameter of cup sides 76 in region 79 is only approximately 0.003 inches smaller than the inside diameter of lamination stack 84 to ensure a tight fit between them. A small pocket 83 in lip 82 receives any epoxy that is forced from between cup 70 and stack 84 during assembly. The combination of lip 82 and mounting surface 97 serves to axially align stator 68 and rotor 72.

The assembled spindle 20 is completely self-contained, which allows spindle 20 to be tested as a stand-alone component without the need to first install spindle 20 in disk drive 10. After testing, spindle 20 is installed in housing 12 as a unit, and is thereafter removable as a unit for repair or replacement.

Figure 4:
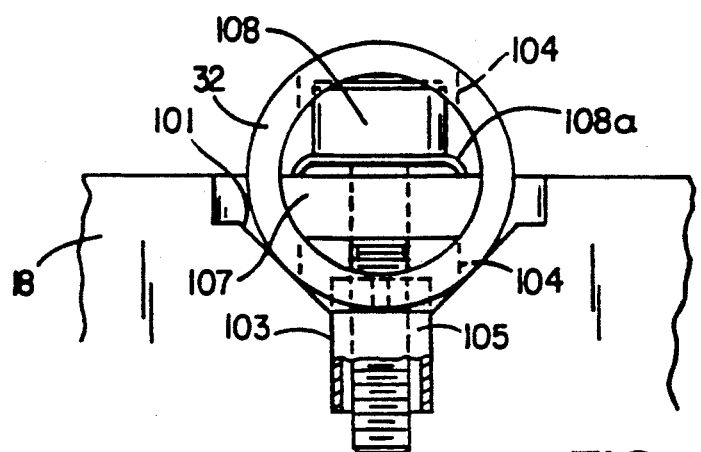
FIGS. 4 and 5 illustrate mounting the ends of the shaft of the spindle of FIG. 1 in the disk drive.
Figure 5:
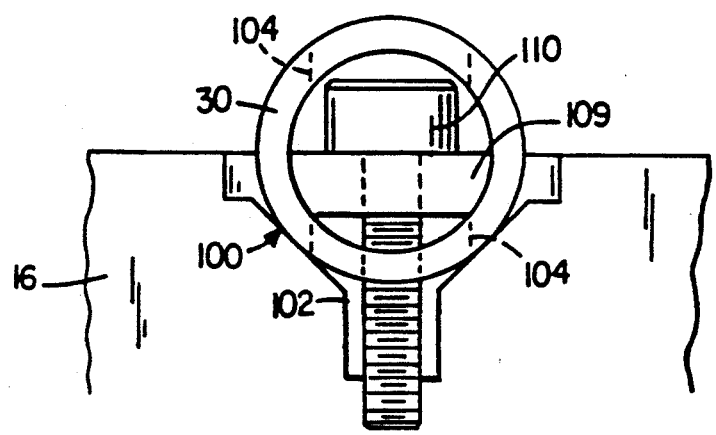

Referring also to FIGS. 4 and 5, installation of spindle 20 within housing 12 proceeds as follows. Housing walls 16, 18 include respective horizontal V-shaped slots 100, 101 for receiving upper and lower ends 30, 32 of shaft 28. V-shaped slots 100, 101 terminate in bores 102, 103 that are aligned with a corresponding pair of through holes 104 in shaft ends 30, 32. Shaft 28 is hollow near ends 30, 32 for purposes described below. A pin 105 having a cylindrical interior opening 106 is press fit into bore 103. Pin 105 has an oval cross section (see FIG. 2) and the major (i.e., longer) axis of the oval is configured to accurately match (such as to within approximately 0.001 inches) the diameter of opening 104. Thus, with pin 105 inserted into bore 103 with its major axis aligned with rotational axis 11, shaft 28 fits tightly over pin 105 with little or no axial play. As a result, disk supporting flange 24 is accurately positioned with respect to pin 105, and thus also with respect to features machined in housing 12 (such as a datum for the positioner for the magnetic heads). The minor (i.e., shorter) axis of the oval cross section of pin 105 is slightly smaller than the diameter of opening 104 to allow shaft 28 to be horizontally centered within V-shaped slot 101.

After shaft 28 has been inserted over pin 105, a half-round, hollow contact block 107 is inserted into shaft end 32 and a screw 108 is passed through contact block 107 and pin 105 and is threaded into a tapped hole behind bore 103. The head of screw 108 engages contact block 107 (either directly or via a belleville spring-type washer 108a) to securely fasten shaft end 32 to wall 18.

Then, the upper end 30 of shaft 28 is secured to wall 16. A pin is not used in view of the axial positioning provided by pin 105 in bore 103. Instead, bore 102 is threaded and receives a screw 110 (which is passed through a contact block 109 preinserted into shaft end 30). The diameter of through hole 104 is relatively large to allow the axial position of screw 110 to be adjusted if necessary for alignment with bore 102.

In operation, motor 66 is energized and controlled in the usual manner. When activated, stator 68 causes rotor 72 (and hence hub 22, bearing sleeve 36, and disks 14) to rotate at high speed (such as 3600 rpm or more) about the stationary elements of spindle 20 (i.e., shaft 28, cup 70, and stator 68) and axis 11. Spindle 20 rotates disks 14 very accurately about axis 11, thereby maintaining the disk tracks in alignment with the read/write head as the disks rotate, in part due to the precision of cartridge bearing assembly 34. That is, because outer races 42, 48 are machined in a single, unitary sleeve 36, they are precisely aligned parallel to each other around their entire circumferences. This reduces bearing runout, friction (with its accompanying heat build-up) and wear.

Referring to FIG. 2, it is seen that stator mount cup 70 supports stator 68 axially between upper and lower bearings 38, 40 and radially outwardly of bearing assembly 34. Cartridge bearing 34 is thus recessed within cup 70 so that stator 68 is positioned axially above lower bearing 40 and radially outside of bearing sleeve 36. This mounting arrangement allows the axial spacing between upper and lower bearings 38, 40 to be maximized while maintaining spindle 20 compact axially. For example, bearings 38, 40 are separated by approximately 2.6 inches, and the total distance from the underside of cup base 74 to the top of bearing assembly is only about 3.25 inches. The relatively large spacing between bearings 38, 40 provides bearing assembly 34 with a high degree of transverse stiffness (i.e., resistance to forces applied, such as by motor 66, perpendicularly to axis of rotation 11).

The result is an increase in the natural (i.e., resonant) frequency of spindle 20, which produces a corresponding decrease in the amplitudes of any axial and radial displacement of hub 22 during rotation. This markedly decreases the amount of wobbling of disks 14 during rotation and the occurrence of repetitive and non-repetitive disk runout, thereby increasing the accuracy with which disks 14 rotate beneath the read/write heads. Track densities can therefore be increased with minimal increase in risk to reliable data storage. The large spacing between individual bearings 38, 40 also lessens the chance that the transverse forces will cause shaft 28 to become cocked with respect to axis 11.

Figure 6:
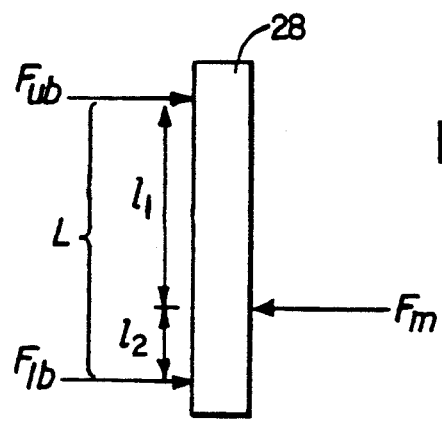
FIG. 6 is a free body diagram useful in understanding the operation of the spindle of FIG. 1.

FIG. 6 shows a free body diagram of the forces applied to shaft 28 at any given time by motor 66 ($F_m$), upper bearing 38 ($F_{ub}$), lower bearing 40 ($F_{lb}$) Because bearings 38, 40 are located on either side of stator 68 (and thus motor 66), they are loaded in the same direction by transverse forces applied by motor 66 (as shown by the orientation of $F_{ub}$ and $F_{lb}$ in the same direction in opposition to $F_m$). This provides further resistance to wobbling.

Additionally, the axial distance between motor 66 and upper bearing 38 ($l_1$) is somewhat equivalent to that between motor 66 and lower bearing 40 ($l_2$)—much more so than if, for example, motor 66 were to be disposed below lower bearing 40. As a result, the transverse forces applied by motor 66 are shared somewhat equally by bearings 38, 40. This is seen by summing the moments about upper bearing 38 (which reveals that the force on the lower bearing, $F_{lb}$, equals $(l_1/L)*F_m$) and comparing the result with that obtained by summing the moments about lower bearing 40 (which shows that the force on the upper bearing, $F_{ub}$ equals $(l_2/L)*F_m$) Accordingly, the difference in the loading of the individual bearings is reduced, which further increases transverse rigidity.

Of course, the forces on bearings 38, 40 can be equalized by centering motor 66 between the bearings (which would make ($l_1=l_2$) Because cup 70 mounts motor 66 radially outwardly of bearing assembly 34, motor 66 can be mounted at any axial location on spindle 20—including in the axial center—simply by further elongating cup 70. Thus, the axial location of motor 66 is essentially not limited by the location of individual bearings 38, 40. Moreover, the positions of bearings 38, 40 are not dictated by the axial location of motor 66.

Other Embodiments

Other embodiments are within the scope of the claims.

Figure 7:
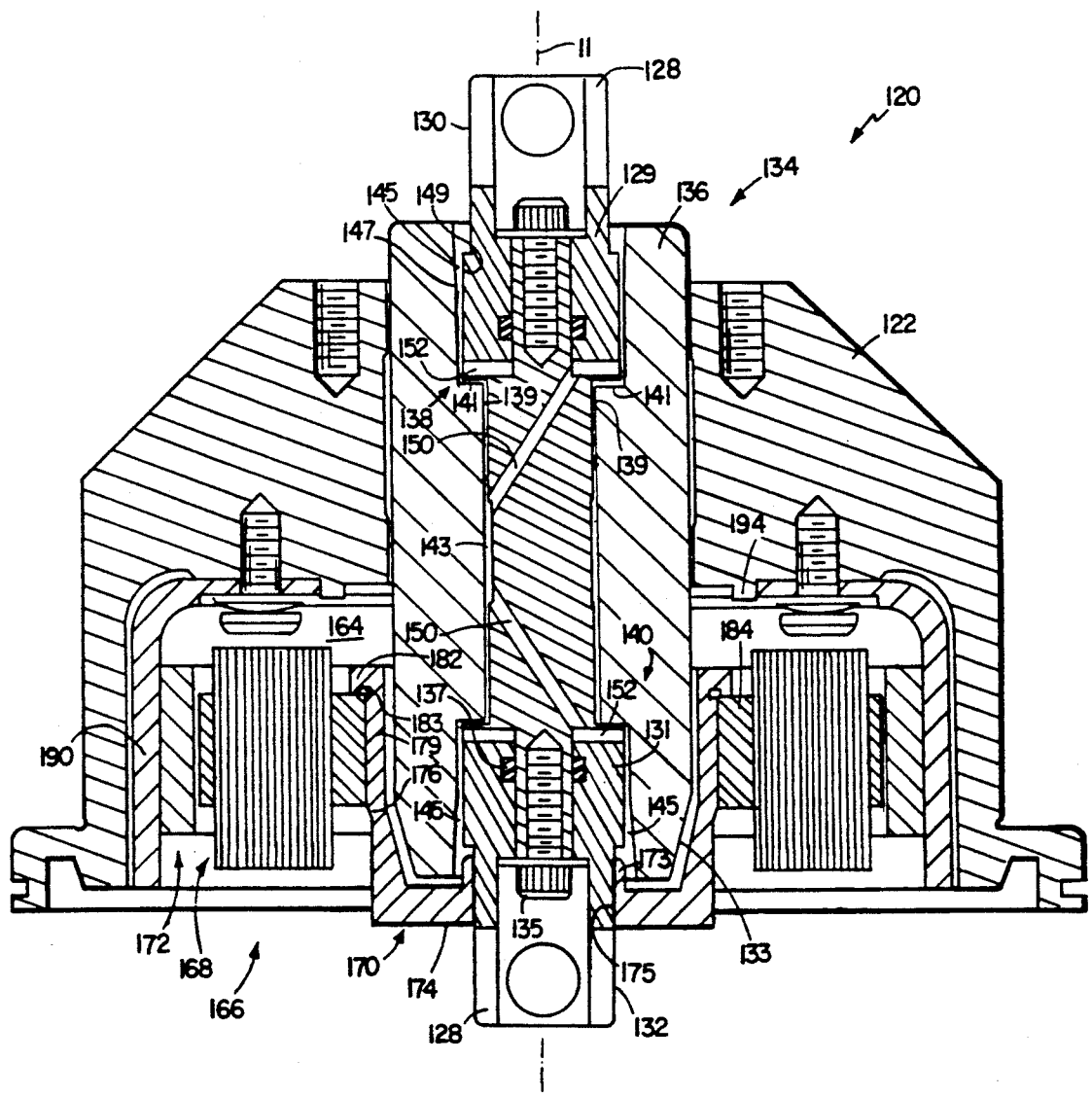
FIG. 7 is a partial cross-sectional view of another embodiment of the spindle assembly of the invention.

Referring to FIG. 7, spindle 120 utilizes a hydrodynamic cartridge bearing assembly 134 in place of ball bearing assembly 34 but is otherwise similar in construction to spindle 20. One example of hydrodynamic bearing 134 is described in U.S. Pat. No. 4,795,275, entitled "Hydrodynamic Bearing", which is incorporated herein by reference. The bearing shaft 128 is stationary and is surrounded by a rotatable bearing sleeve 136. A pair of cylindrical thrust plates 129, 131 are respectively disposed near the upper and lower ends 130, 132 of shaft 128. Each thrust plate 129, 131 fits tightly over shaft 128 and is secured in place with a screw 135 that threads into shaft 128. An O-ring 137 seals each joint between shaft 128 and the associated thrust plate 129, 131. (Alternatively, thrust plates 129, 131 can be heat shrunk onto shaft 128.)

A pair of hydrodynamic bearings 138, 140 are disposed near upper and lower shaft ends 130, 132, respectively. Each bearing 138, 140 is defined by an axially extending clearance space 139 between shaft 128 and sleeve 136, and a radially extending clearance space 141 between the respective thrust plate 129, 131 and sleeve 136. Clearance spaces 139, 141 are filled with oil (not separately shown) and are in communication with each other and with an oil reservoir 143 near the axial center of shaft 128. Axial clearance spaces 139 of bearings 138, 140 are between approximately 0.0002 inches and 0.001 inches wide (possibly wider at reservoir 143); radial clearance spaces 141 span between approximately 0.0005 inches and 0.002 inches. (The clearance spaces are shown enlarged for clarity.)

During rotation of sleeve 136 about shaft 128, the oil within clearance spaces 139, 141 is pressurized to maintain separation between sleeve 136 and shaft 128. At each bearing 138, 140, the hydrodynamically pressurized oil in clearance spaces 139 provides sufficient stiffness to support radial loads. Axial loads are supported by each bearings 138, 140 via the pressurized oil in clearance spaces 141.

Upper and lower bearings 138, 140 are each sealed by a surface tension dynamic seal 145 formed between axially extending surfaces 147, 149 of sleeve 136 and the associated thrust plate 129, 131. Seals 145 are "dynamic" because of the relative rotation between each thrust plate 129, 131 and sleeve 136. As explained in the aforementioned patent, the surface tension seal is formed between each pair of surfaces 147, 149 by configuring such surfaces to diverge from one other (toward the ends of shaft 128) in a straight taper of approximately 2 degrees. During operation, the axial position of the interface between the oil and the surrounding atmosphere changes with external pressure differences applied to the bearing until the surface tension forces in the oil are balanced by the external pressure forces. The clearance spaces of bearing 138 are connected to those of bearing 140 by pressure equalization ports 150, 152. Ports 150 extend generally axially through shaft 128 and connect with radially extending ports 152 in thrust plates 129, 131. As discussed in the patent, pressure equalization ports 150, 152 serve to equalize the oil pressure in the clearance spaces 139, 141 of the respective bearings to avoid pumping the oil through seals 145. Alternatively, the pressure equalization ports may be disposed within sleeve 136.

Hydrodynamic bearing 134, like ball bearing 34 of FIG. 2, is a cartridge bearing and thus is preassembled onto shaft 128 before assembly into spindle 134. The procedure for assembling spindle 134 is identical to that discussed above.

When fully assembled, spindle 120 is a self-contained unit having disk supporting hub 122 shrunk fit tightly around the outside of bearing sleeve 136. The base 174 of a stator mount Cup 170 is shrunk fit onto shaft 128 near lower end 132 of shaft 128, and the stator 168 of motor 166 fits tightly around, and is epoxied to, the sides 176 of cup 170 in the same manner as discussed above. The rotor 172 is mounted opposite to stator 168 in the lower portion of hub 122, also in the same manner as described above. The ring 190 which supports rotor 172 is centered about axis 11 by flange 194 that protrudes into cavity 164.

An annular lip 182 at the uppermost end of sides 176 provides an accurate reference for the axial position of the stator lamination stack 184 during assembly (a pocket 183 in lip 182 collects excess epoxy during assembly). Stator mount cup 170 thus supports at least some portion of stator 168 above lower hydrodynamic bearing 140, and as a result, motor 166 is at least partially positioned between upper and lower bearings 138, 140. Mount cup 170 also supports stator 168 radially outside of the rotating bearing sleeve 136. The sides 176 of cup 170 are spaced by approximately 0.030 inches from the outer surface of sleeve 136. In addition, cup base 174 is disposed about 0.030 inches below the lower end 133 of bearing 134.

Stator mount cup 170 differs slightly in construction from mount cup 70. For example, base 174 includes an axially enlarged shoulder 173 bordering central opening 175. Shoulder 173 has a total axial extension of about 0.29 inches and increases the rigidity of the joint between base 174 and shaft 128, while allowing the thickness of the remainder of base 174 to be reduced (such as to 0.160 inches) for enhanced heat dissipation. In addition, sides 176 gradually increase thickness below the region 179 in which stator lamination stack 184 joins sides 176 (from about 0.080 inches to approximately 0.170 inches). This serves both to increase the rigidity of cup 170 and to provide a somewhat uniform spacing between cup 170 and bearing sleeve 136, which bevels inward near end 133. Beveled end 133 serves as a key to ensure that bearing 134 is inserted onto hub 122 in the correct orientation for rotation of bearing sleeve 136 in the proper direction.

Still other embodiments are within the scope of the claims.

For example, each shaft 28, 128 and stator mount cup 70, 170 could be formed with as monolithic (i.e., integral) structure from a single piece of material. This would eliminate an assembly step (and concomitantly remove the need to locate the mount cup at a predetermined position during assembly). Perhaps more importantly, there would be no requirement to apply heat near the bearing during spindle assembly. For similar reasons, hub 22 could be bonded to sleeve 36 with epoxy or other adhesive.

The stator lamination stack could alternatively be heat shrunk onto the stator mount cup 70, 170.

Cups 70, 170 need not completely surround the respective shafts, but instead may each include one or more openings in its side. This serves to further reduce the mass of the cup, thereby also lowering the amount of heat needed to heat shrink the cup onto the shaft. The cup sides must be sufficiently strong, however, to rigidly support the stator.

We claim:

1. A disk drive spindle comprising
a hub supported by a bearing assembly for rotation about a stationary shaft, said bearing assembly including a pair of bearings axially spaced along said shaft,
a motor for rotating said hub about an axis of said shaft, and
a mount attached to a portion of said shaft that is disposed axially outwardly of said pair of bearings, said mount having a region that is disposed radially outwardly of said bearing assembly and extends a substantial axial distance between said pair of bearings, at least a portion of said motor being secured to said region of said mount so that said motor is disposed substantially axially between said pair of bearings.

2. The spindle of claim 1 wherein said bearing assembly includes a sleeve disposed for rotation about said shaft by said pair of bearings, said mount meeting said shaft at a region axially spaced from a first end of said bearing assembly and including a support region for said motor that extends axially along said sleeve and is spaced radially from said sleeve.

3. The spindle of claim 2 wherein a first one of said bearings is disposed near said first end of said bearing assembly, said support region having a free end that is disposed axially adjacent to at least a portion of said first bearing.

4. The spindle of claim 3 wherein said bearings comprise ball bearings.

5. The spindle of claim 3 wherein said bearings comprise hydrodynamic bearings.

6. The spindle of claim 2 wherein said support region defines a cup that includes a central opening for axially receiving at least a portion of said bearing assembly.

7. The spindle of claim 6 wherein said cup surrounds at least said portion of said first bearing.

8. The spindle of claim 2 wherein said portion of said motor includes a stator secured to an outer surface of said support region.

9. The spindle of claim 8 wherein said support region is constructed to mount said stator at a predetermined axial position with respect to said first bearing.

10. The spindle of claim 9 wherein said support region includes a radially extending lip near said free end for engaging a portion of said stator when said stator is at said predetermined axial position.

11. The spindle of claim 1 wherein said region of said mount for securing said motor to said shaft extends approximately one third of the axial spacing between said pair of bearings.

12. The spindle of claim 2 wherein said mount further includes a base axially spaced from said bearing assembly, said base connecting said support region to said shaft.

13. The spindle of claim 12 wherein said base has a nominal thickness between said shaft and said support region, said base including an axially enlarged portion near an intersection between said base and said shaft.

14. The spindle of claim 12 wherein said mount and said shaft comprise a unitary structure.

15. The spindle of claim 6 wherein ends of said bearing assembly have differing configurations, said cup being configured so that said central opening generally conforms to the configuration of one of said ends.

16. The spindle of claim 2 wherein said hub is secured to said sleeve and is constructed to support a second portion of said motor adjacent to said first portion of said motor.

17. The spindle of claim 16 wherein said hub includes a cavity for receiving said mount and said first portion of said motor, said second portion of said motor being secured within said hub.

18. The spindle of claim 17 wherein said hub is constructed to center said second portion of said motor with respect to said axis.

19. The spindle of claim 18 wherein said first portion of said motor comprises a stator and said second portion of said motor includes a rotor.

20. The spindle of claim 1 wherein said hub is secured to said sleeve and is constructed to engage said sleeve in at least one region that is axially spaced from each of said bearings.

21. The spindle of claim 1 wherein the region of said mount that engages said portion of said motor is disposed entirely axially between said pair of bearings.

22. The spindle of claim 1 wherein each one of said bearings includes an inner bearing surface on said shaft and an outer bearing surface, the outer bearing surfaces of said pair of bearings being disposed in a single, axially elongated sleeve that rotates about said shaft.

23. The spindle of claim 1 wherein said shaft includes a pair of ends each of which is secured to a housing of said disk drive.

24. The spindle of claim 1 wherein said hub includes a support surface for at least one disk, and further comprising means for securing at least one end of said shaft to said housing so that said support surface is disposed at a predetermined axial position in said housing.

25. The spindle of claim 24 wherein said securing means comprises a hole disposed in said end of said shaft at a predetermined axial position with respect to said support surface, and a pin disposed in said housing for engaging said shaft through said hole.

26. The spindle of claim 24 further comprising means for securing a second end of said shaft to said housing.

27. A disk drive spindle comprising
a hub supported by a bearing assembly for rotation about a stationary shaft, said bearing assembly including a pair of bearings axially spaced along said shaft and a sleeve disposed for rotation about said shaft by said pair of bearings,
a motor for rotating said hub about an axis of said shaft, and
a mount for securing at least a portion of said motor to said shaft so that said portion of said motor is disposed radially outwardly of said bearing assembly and at least partially axially between said pair of bearings, said mount meeting said shaft at a region axially spaced from a first end of said bearing assembly and including a support region being for said motor that extends axially along said sleeve and is spaced radially from said sleeve, said support region being constructed to mount a stator of said motor on an outer surface of said support region at a predetermined axial position with respect to a first one of said bearings and including a radially extending lip near a free end of said support region for engaging a portion of said stator when said stator is at said predetermined axial position,
wherein said stator is secured to said support region by adhesive, said lip including an opening for collecting excess adhesive.

28. A disk drive spindle comprising
a hub supported by a bearing assembly for rotation about a stationary shaft, said bearing assembly including a pair of bearings axially spaced along said shaft and a sleeve disposed for rotation about said shaft by said bearings,
a motor for rotating said hub about an axis of said shaft, and
a mount for securing at least a portion of said motor to said shaft so that said portion of said motor is disposed radially outwardly of said bearing assembly and at least partially axially between said pair of bearings,
wherein said hub is secured to said sleeve and includes a pair of spaced regions for engaging said sleeve, each of said regions being axially spaced from each of said bearings.

29. A disk drive spindle comprising
a hub including a support surface for at least one disk, said hub being supported by a bearing assembly for rotation about a stationary shaft, said bearing assembly including a pair of bearings axially spaced along said shaft,
a motor for rotating said hub about an axis of said shaft,
a mount for securing at least a portion of said motor to said shaft so that said portion of said motor is disposed radially outwardly of said bearing assembly and at least partially axially between said pair of bearings, and
means for securing at least one end of said shaft to a housing of said disk drive so that said support surface is disposed at a predetermined axial position in said housing, said securing means comprising a hole disposed in said at least one end of said shaft at a predetermined axial position with respect to said support surface, and a pin disposed in said housing for engaging said shaft through said hole, said pin being disposed transverse to said axis of rotation and having an outer diameter approximately equal to a diameter of said opening along said axis to substantially prevent movement of siad shaft along said axis.

30. The spindle of claim 29 wherein said pin has a second outer diameter oriented transverse to said axis and smaller than the diameter of said opening to enable adjustment of a position of said shaft transverse to said axis.

31. A disk drive spindle comprising
a hub including a support surface for at least one disk, said hub being supported by a bearing assembly for rotation about a stationary shaft, said bearing assembly including a pair of bearings axially spaced along said shaft,
a motor for rotating said hub about an axis of said shaft, and
a mount for securing at least a portion of said motor to said shaft so that said portion of said motor is disposed radially outwardly of said bearing assembly and at least partially axially between said pair of bearings,
means for securing at least one end of said shaft to a housing of said disk drive so that said support surface is disposed at a predetermined axial position in said housing, said securing means comprising a hole disposed in said at least one end of said shaft at a predetermined axial position with respect to said support surface, and a pin disposed in said housing for engaging said shaft through said hole, and
means for securing said end of said shaft to said pin.

* * * * *